(12) United States Patent
Austin et al.

(10) Patent No.: US 8,139,874 B2
(45) Date of Patent: Mar. 20, 2012

(54) DISK SECTOR ALLOCATION FOR HIGH PERFORMANCE ACCESS TO IMAGES

(75) Inventors: Paul R. Austin, Webster, NY (US);
Robert R. Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 457 days.

(21) Appl. No.: 12/510,289

(22) Filed: Jul. 28, 2009

(65) Prior Publication Data

US 2011/0026852 A1 Feb. 3, 2011

(51) Int. Cl.
*G06K 9/36* (2006.01)
(52) U.S. Cl. ........................... 382/232; 382/305
(58) Field of Classification Search .................. 382/100, 382/232, 233, 244, 305; 709/220; 714/114
See application file for complete search history.

(56) References Cited

U.S. PATENT DOCUMENTS 6,954,532 B1 * 10/2005 Handley et al. ............... 382/302
7,546,415 B2 6/2009 Blinick et al.

OTHER PUBLICATIONS

Prabhakar et al., "Browsing and Placement of Multi-Resolution Images on Parallel Disks", Multimedia Systems 8: 459-469, 2003.

* cited by examiner

*Primary Examiner* — Duy M Dang
(74) *Attorney, Agent, or Firm* — Gibb I.P. Law Firm, LLC (57) ABSTRACT

An image data storage system and associated method store, on one or more disk drives in a disk drive array, original image data for different images as well as multiple resolution levels of compressed image data for each image. The lowest resolution level image data for multiple different images (i.e., "thumbnail" copies of images) are grouped together and stored within sectors closest to the center. The progressively higher resolution levels of image data for the same images can similarly be grouped together and stored within sectors sequentially from a first track closest to the center to a last track closet to an outer edge. Alternatively, all higher resolution levels of image data for any single image can be grouped together and stored within a same sector as close to the center as possible. This organization can significantly reduce average access time for large collections of images.

21 Claims, 4 Drawing Sheets

DISK SECTOR ALLOCATION FOR HIGH PERFORMANCE ACCESS TO IMAGES

BACKGROUND AND SUMMARY

Embodiments herein generally relate to image data storage repositories and, more particularly, to embodiments of an image data storage system and an associated image data storage method which store, on one or more disk drives in a disk drive array, original image data for different images and also, for each image, multiple resolution levels of compressed image data with each level representing a progressively lower resolution copy of the image.

Modern image data storage repositories use disk drive arrays, such as redundant arrays of independent disks (RAID), to store original image data for millions of different images and also multiple resolution levels of compressed image data for each image with each level representing a progressively lower resolution copy of the image. Such repositories allow users to browse through "thumbnail" images, having the lowest resolution level, and to select a specific image in order to view the image at a higher resolution level and/or to zoom-in on a portion of the specific image. Traditionally, storage and retrieval of image data on the disk drives in RAIDs is accomplish using caching and de-segmentation techniques. Unfortunately, increases in the number of images being stored as well as increases in the number of resolution levels of image data for each image being stored have resulted in a corresponding increase in the time required for image data retrieval (i.e., the access time).

In view of the foregoing, disclosed herein are embodiments of an image data storage system and an associated image data storage method. The embodiments store, on one or more disk drives (e.g., in a disk drive array), original image data for different images as well as multiple resolution levels of compressed image data for each image. The embodiments further manage placement of this image data within sectors on each disk drive in order to improve access time to the most commonly accessed resolution level of image data. Specifically, the lowest resolution level image data for multiple different images (i.e., "thumbnail" copies of multiple different images) are grouped together and stored within sectors closest to the center that may be accessed fastest. Progressively higher resolution levels of image data for these same images can also be grouped together and stored sequentially from a first track closest to the center to a last track closet to an outer edge. Alternatively, all higher resolution levels of image data for any single image can be grouped together and stored within a same sector as close to the center as possible.

More particularly, disclosed herein are embodiments of an image data storage system. The system embodiments can comprise a computer, disk drive array, and a disk drive array controller in communication with both the computer and the disk drive array (e.g., a redundant array of independent disks (RAID), such as a RAID-5).

The computer can incorporate a data compressor. The data compressor can receive original image data representative of multiple different images and can compress that original image data in order to generate, for each image, multiple resolution levels of compressed image data with each level representative of a progressively lower resolution copy of the image. For example, by using a JPEG 2000 compression standard, the image data compressor can generate, for each image at each level, compressed image data in the form of a wavelet coefficient that is a lower resolution copy of the image and can also generate additional information (e.g., three additional wavelet coefficients) that can be used to decompress that compressed image data. It can further generate the multiple resolution levels of compressed image data such that the resolution of image data in each progressively lower resolution level is approximately one-half the resolution of image data in a next higher resolution level image and such that the lowest resolution level image data has a longest dimension between approximately 120 and 150 pixels and uses approximately 2 bits/pixel.

The disk drive array can comprise one or more disk drives. Each disk drive can have a center and multiple tracks encircling the center. Each track can be sub-divided into multiple sectors. The disk drive array can receive, from the computer, the original image data for all the images, the multiple resolution levels of compressed image data for each image, and the additional information associated with each image at each level. The disk drive array can then store the original image data and the multiple resolution levels of compressed image data for all of the images such that, on any given disk drive, sectors positioned on a track closest to the center store lowest resolution level image data and other sectors positioned on tracks farther from the center store higher resolution level image data. The disk drive array can further store the original image data and the multiple resolution levels of compressed image data for all of the images such that, on the any given disk drive, progressively higher resolution levels of image data are stored from a first track closest to the center to a last track closet to an outer edge of the given disk drive or, alternatively, such that, on the any given disk drive, all higher resolution levels of image data for any single image are stored within a same sector. Finally, the disk drive array can store any additional information associated with any one resolution level of compressed image data for a given image in a same track and sector as a next higher resolution level of compressed image data for the given image.

In one embodiment of the system, the disk drive array controller can manage the entire process by which the image data is stored within the disk drive array. That is, the disk drive array controller can manage both image data distribution across multiple disk drives in the array, if applicable, and also image data placement within the multiple tracks and the multiple sectors of each disk drive, as described above. Alternatively, the computer can comprise an operating system that manages image data distribution across multiple disk drives in the array, if applicable, and the controller can manage image data placement within the multiple tracks and the multiple sectors of each disk drive.

Also disclosed herein are embodiments of an image data storage method. The method embodiments can comprise receiving, by a computer, original image data representative of multiple different images. This original image data can then be compressed, by a data compressor in the computer, in order to generate, for each image, multiple resolution levels of compressed image data with each level representative of a progressively lower resolution copy of the image. For example, a JPEG 2000 compression standard can be used by the data compressor to generate, for each image at each level, compressed image data in the form of a wavelet coefficient that is a lower resolution copy of the image and also additional information (e.g., three additional wavelet coefficients) for use in decompressing the compressed image data, if necessary.

Next, the method embodiments can comprise receiving, by a disk drive array from the computer, the original image data for all of the images, the multiple resolution levels of compressed image data for each image, and the additional information associated with each image at each level. This disk drive array can comprise one or more disk drives with each disk drive having a center and multiple tracks encircling the center and with each track sub-divided into multiple sectors. For example, the disk drive array can comprise a redundant array of independent disks (RAID).

The method embodiments can then comprise storing, by the disk drive array, the original image data for all the images and also the multiple resolution levels of compressed image data for each image such that, on any given disk drive, sectors positioned on a track to the center store lowest resolution level image data and other sectors positioned on tracks farther from the center store higher resolution level image data. This storing process can further be performed such that, on the any given disk drive, progressively higher resolution levels of image data are stored from a first track closest to the center to a last track closet to an outer edge of the given disk drive or, alternatively, such that, on the any given disk drive, all higher resolution levels of image data for any single image are stored within a same sector. Finally, this storing process can be performed such that any additional information associated with any one resolution level of compressed image data for a given image is stored in a same track and sector as a next higher resolution level of compressed image data for the given image.

In one embodiment of the method, the entire process by which the image data is stored within the disk drive array can be managed by a disk drive array controller. Specifically, this method embodiment can comprise managing, by a disk drive array controller in communication with the computer and the disk drive array, both image data distribution across multiple disk drives in the array, if applicable, and also image data placement within the multiple tracks and the multiple sectors of each disk drive, as described above. Alternatively, in another embodiment of the method the process by which the image data is stored within the disk drive array can be managed by both computer operating system and a disk drive array controller in combination. Specifically, this method embodiment can comprise managing, by the operating system of the computer, image data distribution across multiple disk drives of the array, if applicable; and managing, by a disk drive array controller in communication with the computer and the disk drive array, image data placement within the multiple tracks and the multiple sectors of each disk drive, as described above.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, modern image data storage repositories use disk drive arrays, such as redundant arrays of independent disks (RAID), to store original image data for millions of different images and also multiple resolution levels of compressed image data for each image with each level representing a progressively lower resolution copy of the image. Such repositories allow users to browse through "thumbnail" images, having the lowest resolution level, and to select a specific image in order to view the image at a higher resolution level and/or to zoom-in on a portion of the specific image. Traditionally, storage and retrieval of image data on the disk drives in RAIDs is accomplish using caching and de-segmentation techniques. Unfortunately, increases in the number of images being stored as well as increases in the number of resolution levels of image data for each image being stored have resulted in a corresponding increase in the time required for image data retrieval (i.e., the access time). Therefore, there is a need in the art for an image data storage system and an associated method that provides for improved data access times.

Disclosed herein are embodiments of an image data storage system and an associated image data storage method. The embodiments store, on one or more disk drives in a disk drive array, original image data for different images as well as multiple resolution levels of compressed image data for each image. The embodiments further manage placement of this image data within sectors on each disk drive in order to improve access time to the most commonly accessed resolution level of image data. Specifically, the embodiments take advantage of the fact that read/write heads, which act on disk drives in a disk drive array, will most frequently be positioned near the center of the disk drives and, therefore, the time it takes to access any particular sector on a disk drive is dependent upon the time it takes to move the read/write head from the center to the particular track containing that sector and also on the time it takes for the disk drive to rotate until the particular sector is in position under the read/write head. Typically, read/write head movement, rather than disk drive rotation time, is the dominant access time factor. Consequently, in the embodiments, the most commonly accessed, lowest resolution level image data for multiple different images (i.e., "thumbnail" copies of multiple different images) are grouped together and stored within sectors closest to the center. Progressively higher resolution levels of image data for these same images can also be grouped together and stored sequentially from a first track closest to the center to a last track closet to an outer edge. Alternatively, all higher resolution levels of image data for any single image can be grouped together and stored within a same sector as close to the center as possible.

Figure 1:
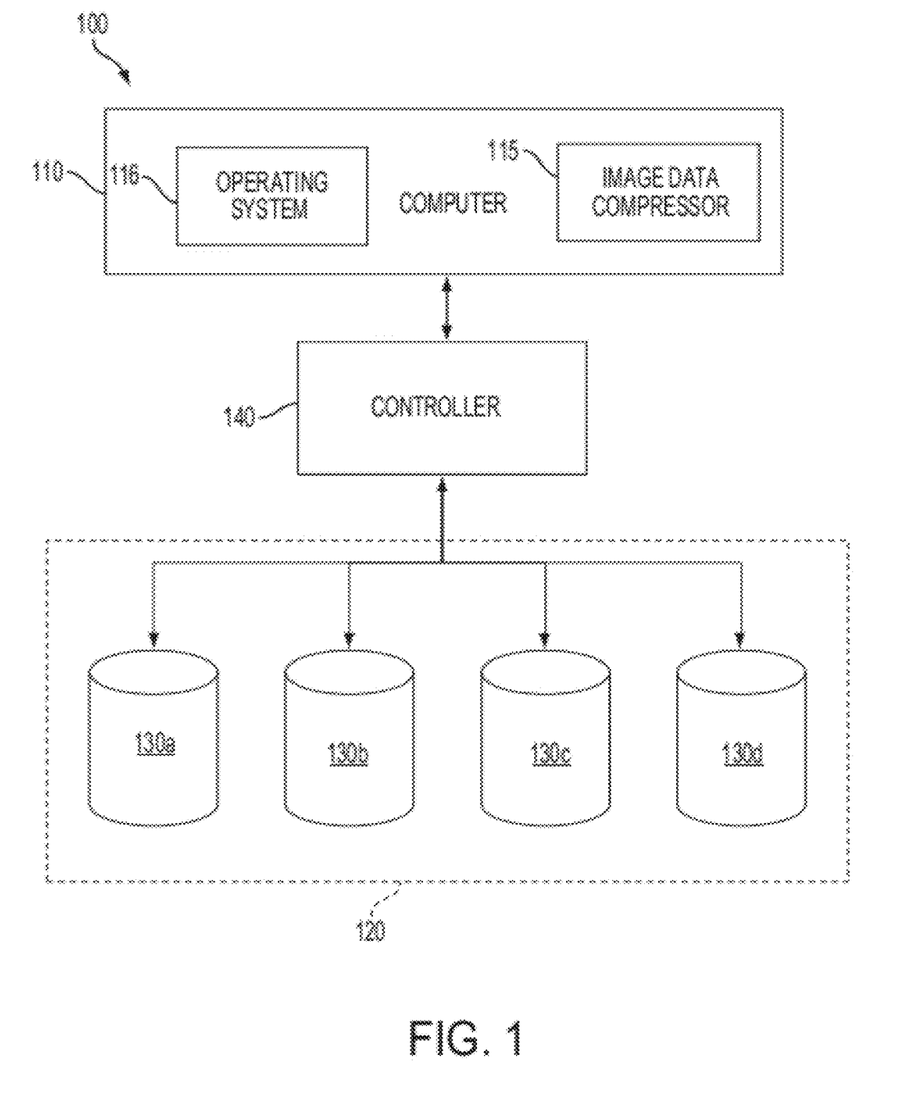
FIG. 1 is a schematic diagram illustrating an embodiment of an image data storage system.
Figure 2:
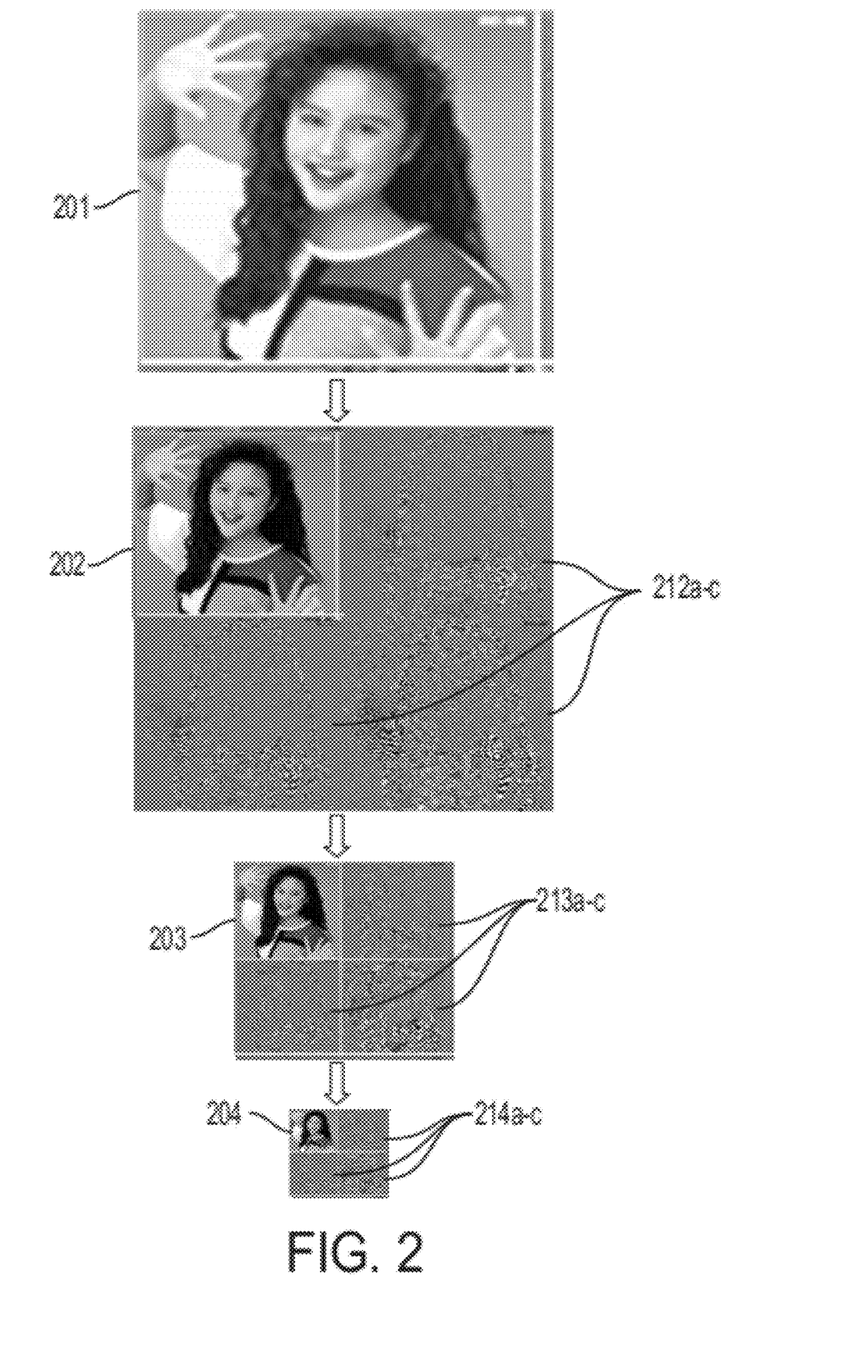
FIG. 2 is a diagram illustrating an original image and multiple levels of compressed image data for the image.
Figure 3:
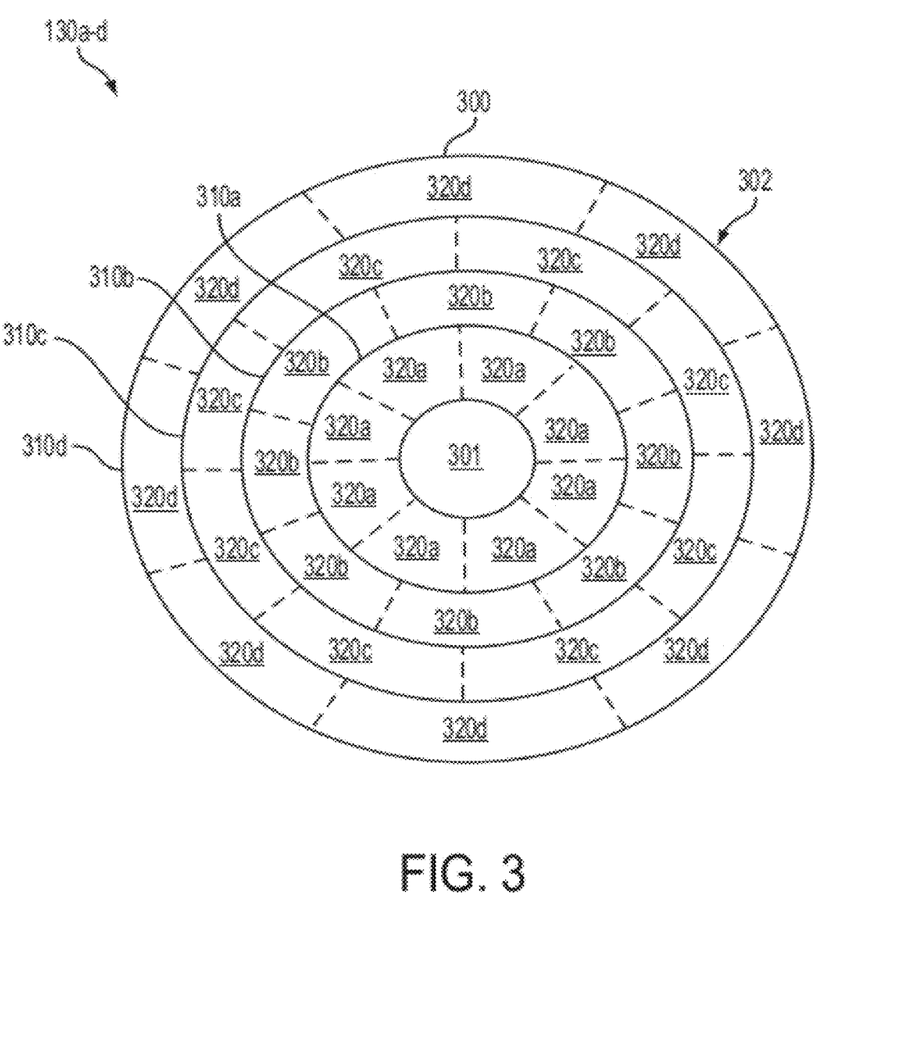
FIG. 3 is a schematic diagram illustrating tracks and sectors within a single disk drive of a disk drive array.

More particularly, referring to FIGS. 1-3 in combination, disclosed herein are embodiments of an image data storage system 100. The system 100 embodiments can comprise a computer 110, disk drive array 120, and a disk drive array controller 140 in communication with both the computer 110 and the disk drive array 120.

The computer 110 can comprise, for example, a desktop computer, a laptop computer, a dedicated server, etc. Computers 110 commonly include chip-based central processing units (CPU's), input/output devices (including graphic user interfaces (GUI)), memories, power supplies, comparators, processors, etc., are well-known and are readily available through a variety of different manufacturers (e.g., Dell Computers, Round Rock Tex., USA and Apple Computer Co., Cupertino Calif., USA). The details of such computers 110 are omitted to allow the reader to focus on the salient aspects of the embodiments described herein.

The computer 110 can incorporate a data compressor 115. The data compressor 115 can receive original image data representative of multiple different images (e.g., from one or more uses via an input device on said computer) and, as shown in FIG. 2, can compress (i.e., can be adapted to compress) that original image data in order to generate, for each original image 201, multiple resolution levels of compressed image data 202-204 with each level representative of a progressively lower resolution copy of the image.

For example, as shown in FIG. 2, by using a JPEG 2000 compression standard, the image data compressor 115 can generate, for each image at each level, compressed image data in the form of a wavelet coefficient 202, 203, 204 that is a lower resolution copy of the image and also additional information 212a-c, 213a-c and 214a-c (e.g., three additional wavelet coefficients) that can subsequently be used to decompress the compressed image data 202, 203, 204, respectively. The image data compressor 115 can further generate the multiple resolution levels of compressed image data such that the resolution of image data in each progressively lower resolution level is approximately one-half the resolution of image data in a next higher resolution level image (e.g., a compressed image 204 is one-half the resolution of a compressed image 203, a compressed image 203 is one-half the resolution of a compressed image 202, etc.) and such that the lowest resolution level image data 204 (i.e., the "thumbnail" images) have a longest dimension between approximately 120 and 150 pixels, use approximately 2 bits/pixel or less and are approximately 10-15 KB in size.

The disk drive array 120 can comprise one or more disk drives 130a-d (e.g., multiple rotating magnetic disk drive storage units) configured, for example, as a redundant array of independent disks (RAID). Those skilled in the art will recognize that a variety of RAID configurations are known. For illustration purposes, the embodiments disclosed herein are described with respect to a RAID-5, which uses combines three or more disk drives in distributed parity so as to protect data against loss of any one disk. The details of such RAIDs are omitted to allow the reader to focus on the salient aspects of the embodiments described herein.

As shown in FIG. 3, each disk drive 130a-d in the array 120 can have a center 301 and multiple tracks 310a-d encircling the center 301 (i.e., concentric tracks). Each track 310a-d can be sub-divided into multiple sectors (e.g., see sectors 320a of track 310a, sectors 320b of track 310b, sectors 320c of track 310c and sectors 320d of track 310d) for storage of image data.

The disk drive array 120 can receive, from the computer 110, the original image data for each image 201, the multiple resolution levels of compressed image data for each image 202, 203, 204, and the additional information associated with each image at each level 212a-c, 213a-c, 214a-c. The disk drive array 120 can then store (i.e., can be adapted to store) the original image data 201 and the multiple resolution levels of compressed image data 202-204 for all of the images in a manner that improves access time.

As mentioned above modern image data storage repositories use disk drive arrays, such as redundant arrays of independent disks (RAID), to store original image data for millions of different images and also multiple resolution levels of compressed image data for each image with each level representing a progressively lower resolution copy of the image. Such repositories allow users to browse through "thumbnail" images, having the lowest resolution level, and to select a specific image in order to view the image at a higher resolution level and/or to zoom-in on a portion of the specific image. Traditionally, storage and retrieval of image data on the disk drives in RAIDs is accomplish using caching and de-segmentation techniques. Unfortunately, increases in the number of images being stored as well as increases in the number of resolution levels of image data for each image being stored have resulted in a corresponding increase in the time required for image data retrieval (i.e., the access time).

For example, when dealing with large quantities of JPEG 2000 images, the Applicants have found that traditional disk caching and de-segmentation techniques reduce performance because JPEG 2000 disk accesses are not uniformly distributed even when access to the images is. JPEG 2000 organizes image data into layers and levels, and extracts images using only the layers and levels required to present a particular view of the image. Using a particular detailed layer or level depends on all of the less detailed layers and levels, which implies that the less detailed levels and layers are consequently much more frequently accessed than the more detailed ones; fortunately they are also much smaller. Additionally, not all disk accesses take the same amount of time. The time needed to obtain data from a given sector largely depends on the time it takes to move the head of a read/write device to move to the track containing that given sector, the time it takes for the disk drive to rotate until the given sector appears under the head of the read/write device and the time it takes to transfer the contents of the sector to the computer's memory. Hence, for a given sequence of sector accesses known a priori, it is possible to layout data on the disk drives to minimize the access time. Since typically disk drive rotation times are shorter than head move times and sector size is constant, an optimal layout will fill in tracks with the most commonly accessed data sequentially from the disk center outward, switching to the next adjacent track when the current one is full.

Since an a priori access sequence for image data access can not be known, it must be approximated through probabilistic analysis. An analysis of access patterns and the organization of images (e.g., JPEG 2000 images) on disk drives provides significant insights into the most likely accesses, so the image data may then be reorganized to minimize access time. For example, multiple different images are uniformly likely to be accessed as "thumbnails". However, in traditional disk organization schemes, the read/write head must skip around the disks to different sectors in order to access such "thumbnails." Additionally, once an image is selected for focus, the likelihood of further zoom and pan for that image is greatly increased. Hence, a image data placement scheme that groups level 1 image data (i.e., the lowest resolution level of image data, "thumbnail" images") into a disk sector near the center track and then groups all remaining image data together as near the logical center track as possible will result in substantially improved performance for this pattern of access. In the context of a web server, this pattern can be somewhat controlled to be highly likely (when compared to general purpose computing file access).

Thus, the disk drive array 120 in the system 100 embodiments disclosed herein improves access time for the most commonly accessed resolution level of image data in the disk drive array 120 (i.e., the "thumbnail" images) by storing the original image data 201 and the multiple resolution levels of compressed image data 202-204 for all of the images such that, on any given disk drive 130a-d, sectors 320a positioned on the track 310a closest to the center 301 store the lowest resolution level image data 204 (i.e., the "thumbnail" images) and other sectors 320b-c positioned on tracks 310a-c farther from the center 301 store higher resolution level image data 201-203. The disk drive array 120 can further store the original image data 201 and the multiple resolution levels of compressed image data 202-204 for all of the images such that, on the any given disk drive (e.g., 130a), progressively higher resolution levels of image data (e.g., levels 204 to 203 to 202 to 201) for multiple images are grouped together and stored sequentially from a first track 310a closest to the center 301 to a last track 310d closet to an outer edge 302 of the given disk drive 130a or, alternatively, such that, on any given disk drive (e.g., 130a), all higher resolution levels of image data 201-203 (i.e., resolution levels higher than the lowest resolution level 204) for any single image are stored within a same sector positioned as close to the center 301 as possible. Finally, the disk drive array 120 can store any additional information associated with any one resolution level of compressed image data for a given image in a same track and sector as a next higher resolution level of compressed image data for the given image. For example, the additional information 214a-c (i.e., the additional wavelet coefficients) associated with the lowest resolution level image data 204 can be stored with the next higher resolution level image data 203, the additional information 213a-c (i.e., the additional wavelet coefficients) associated with the resolution level image data 203 can be stored with the next higher resolution level image data 203, etc.

In one embodiment of the system 100, the disk drive array controller 140 can automatically manage (i.e., can be adapted to automatically manage) the entire process by which the image data is stored within the disk drive array 120. That is, the disk drive array controller 140 can manage both image data distribution across multiple disk drives 130a-d in the array 120, if applicable, and also image data placement within the multiple tracks 310a-d and the multiple sectors 320a-d of the each disk drive 130a-d, as described above. However, those skilled in the art will recognize that many conventional RAIDs are implemented using software provided by host computer operating systems that automatically manage both image data distribution across multiple disk drives in the RAID and also image data placement within the multiple tracks and the multiple sectors of the disk drives in the RAID. Thus, in an alternative embodiment of the system 100, rather than requiring the controller 140 to manage the entire image data storage process, the computer 110 can comprise an operating system 116 that can at least manage (i.e., can be adapted to automatically manage) image data distribution across multiple disk drives 130a-d in an array 120 configured according to a specific RAID distribution scheme and the controller 140 can then step in and directly and automatically manage image data placement within the multiple tracks 310a-d and the multiple sectors 320a-d of each disk drive 130a-d.

It should be noted that the controller 140 may be implemented in the form of software and/or hardware. Furthermore, while the system 100 is shown in FIG. 1 as having a number of discrete components (e.g., computer 110, controller 140 and disk drive array 140), any two or more of these components may be combined into a single component (e.g., the computer 100 can incorporate the controller 140 and the disk drive array 110) and any one of these components may be divided into two or more components.

Figure 4:
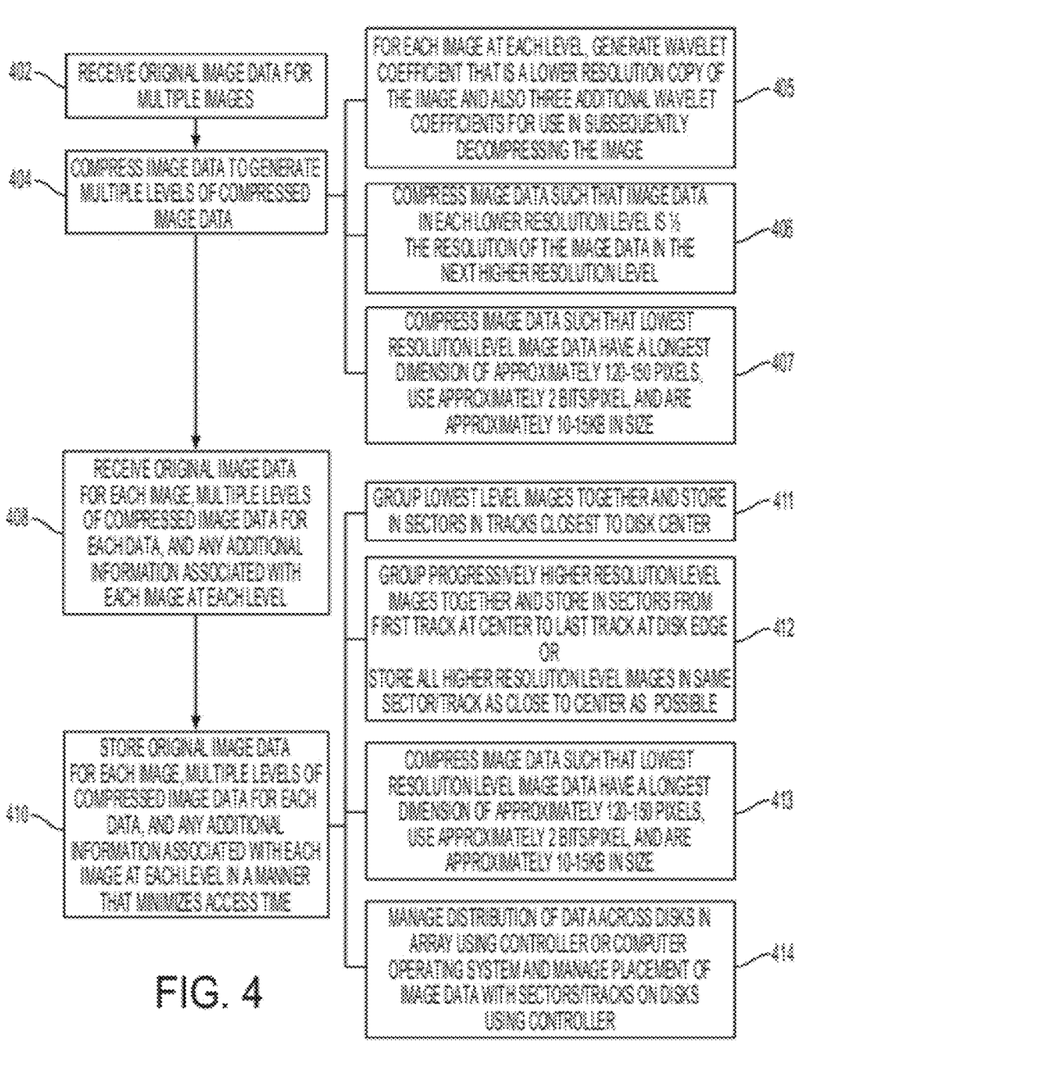
FIG. 4 is a flow diagram illustrating an embodiment of an image data storage method.

Referring to FIG. 4 in combination with FIGS. 1-3, as described above, also disclosed herein are embodiments of an image data storage method. The method embodiments can comprise receiving, by a computer 110, original image data representative of multiple different images (402). This original image data can then be compressed, by a data compressor 115 in the computer 110, in order to generate, for each image, multiple resolution levels of compressed image data with each level representative of a progressively lower resolution copy of the image (404).

For example, a JPEG 2000 compression standard can be used by the data compressor 115 to generate, for each image at each level, compressed image data in the form of a wavelet coefficient 202, 203, 204 that is a lower resolution copy of the image and also additional information 212a-c, 213a-c, 214a-c (e.g., three additional wavelet coefficients) for use in subsequently decompressing the compressed image data 202, 203, 204, respectively (405). This image data compression process can further be performed such that the resolution of image data in each progressively lower resolution level is approximately one-half the resolution of image data in a next higher resolution level image (e.g., a compressed image 204 is one-half the resolution of a compressed image 203, a compressed image 203 is one-half the resolution of a compressed image 202, etc.) (406) and such that the lowest resolution level image data 204 (i.e., the "thumbnail" images) have a longest dimension between approximately 120 and 150 pixels, use approximately 2 bits/pixel or less and are approximately 10-15 KB in size (407).

Next, the method embodiments can comprise receiving, by a disk drive array 120 from the computer 110, the original image data for all of the images, the multiple resolution levels of compressed image data for each image, and the additional information associated with each image at each level (408). This disk drive array 120 can comprise one or more disk drives 130a-d with each disk drive having a center 301 and multiple tracks 310a-d encircling the center 301 (i.e., concentric tracks) and with each track 130a-d sub-divided into multiple sectors 320a-d for storing data. For example, the disk drive array 120 can comprise a redundant array of independent disks (RAID, such as a RAID-5.

The method embodiments can then comprise storing, by the disk drive array 120, the original image data for all the images, the multiple resolution levels of compressed image data for each image and the additional information associated with each image at each level in a manner that minimizes access time (410). Specifically, the method embodiments can then comprise storing, by the disk drive array 120, the original image data 201 for all the images and the multiple resolution levels of compressed image data 202-204 for each image such that, on any given disk drive (e.g., 130a), sectors 320a positioned on the track 310a closest to the center 301 store lowest resolution level image data 204 (i.e., "thumbnail" images) and other sectors 320b-d positioned on tracks 310b-d farther from the center 301 store higher resolution level image data 201-203 (411). This storing process 410 can further be performed such that, on the any given disk drive (e.g., 130a), progressively higher resolution levels (e.g., 204 to 203 to 202 to 201) of image data for multiple images are each grouped together and stored in sectors sequentially from a first track 310a closest to the center 301 to a last track 310d closet to an outer edge 302 of the given disk drive 130a or, alternatively, such that, on the any given disk drive (e.g., 130a), all higher resolution levels of image data 201-203 (i.e., resolution levels higher than the lowest resolution level 204) for any single image are stored within a same sector as close to the center 301 as possible (412). Finally, this storing process can be performed such that any additional information associated with any one resolution level of compressed image data for a given image is stored in a same track and sector as a next higher resolution level of compressed image data for the given image (413).

In one embodiment of the method, the entire process 410 by which the image data is stored within the disk drive array 120 can be managed by a disk drive array controller 140. Specifically, this method embodiment can comprise automatically managing, by a disk drive array controller 140 in communication with the computer 110 and the disk drive array 120, both image data distribution across multiple disk drives 130a-d in the array 120, if applicable, and also image data placement within the multiple tracks 310a-d and the multiple sectors 320a-d of each disk drive 130a-d, as described above (414). Alternatively, in another embodiment of the method, the process 410 by which the image data is stored within the disk drive array 120 can be managed by both a computer operating system 116 and a disk drive array controller 140 in combination. Specifically, this method embodiment can comprise automatically managing, by the operating system 116 of the computer 110, image data distribution across multiple disk drives 130a-d of the array 120, if applicable, and automatically managing, by a disk drive array controller 140 in communication with the computer 110 and the disk drive array 120, image data placement within the multiple tracks 310a-d and the multiple sectors 320a-d of each disk drive 130a-d, as described above.

Also disclosed herein are embodiments of a computer program product. This computer program product can comprise a tangible computer-usable (i.e., computer-readable) medium on which a computer-useable (i.e., computer-readable) program code (i.e., a control program, a set of executable instructions, etc.) is recorded or embodied. Tangible computer-usable media can, for example, a memory device on which the program is recorded or, alternatively, can comprise a transmittable carrier wave in which the program is embodied as a data signal. Exemplary forms of tangible computer-usable media include, but are not limited to, floppy disks, flexible disks, hard disks, magnetic tape, any other magnetic storage medium, CD-ROM, DVD, any other optical medium, a RAM, a PROM, an EPROM, a FLASH-EPROM, any other memory chip or cartridge, transmission media (e.g., acoustic or light waves generated during radio wave or infrared data communications, respectively) or any other medium from which a computer can read and use program code. In this case, the computer-usable program code can be specifically configured to perform the above-described storing process and particularly to manage image data placement within sectors and tracks on the disk drives of a disk drive array, as described above. That is, the computer-usable program code can be executed by a computer in order to perform all or portions of the above-described method.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of an image data storage system and an associated image data storage method. The embodiments store, on multiple disk drives in a disk drive array, original image data for different images as well as multiple resolution levels of compressed image data for each image. The embodiments further manage placement of this image data within sectors on each disk drive in order to improve access time to the most commonly accessed resolution level of image data. Specifically, the embodiments take advantage of the fact that read/write heads, which act on disk drives in a disk drive array, will most frequently be positioned near the center of the disk drives and, therefore, the time it takes to access any particular sector on a disk drive is dependent upon the time it takes to move the read/write head from the center to the particular track containing that sector and also on the time it takes for the disk drive to rotate until the particular sector is in position under the read/write head. Typically, read/write head movement, rather than disk drive rotation time, is the dominant access time factor. Consequently, in the embodiments, the most commonly accessed, lowest resolution level image data for multiple different images (i.e., "thumbnail" copies of multiple different images) are grouped together and stored within sectors closest to the center. Progressively higher resolution levels of image data for these same images can also be grouped together and stored sequentially from a first track closest to the center to a last track closet to an outer edge. Alternatively, all higher resolution levels of image data for any single image can be grouped together and stored within a same sector as close to the center as possible. This organization can significantly reduce average access time for large collections of images.

What is claimed is:

1. An image data storage system comprising:
a computer comprising a data compressor receiving original image data representative of multiple different images and compressing said original image data in order to generate, for each image, multiple resolution levels of compressed image data with each level representative of a progressively lower resolution copy of said image; and
a disk drive array receiving, from said computer, said original image data and said multiple resolution levels of compressed image data,
said disk drive array comprising at least one disk drive, each disk drive having a center and multiple tracks encircling said center, and each track being sub-divided into multiple sectors, and
said disk drive array storing said original image data and said multiple resolution levels of compressed image data for all of said images such that, on any given disk drive, sectors positioned a track closest to said center store lowest resolution level image data and other sectors positioned on tracks farther from said center store higher resolution level image data.

2. The image data storage system of claim 1, said disk drive array further storing said original image data and said multiple resolution levels of compressed image data for all of said images such that, on said any given disk drive, progressively higher resolution levels of image data are stored from a first track closest to said center to a last track closet to an outer edge of said given disk drive.

3. The image data storage system of claim 1, said disk drive array further storing said original image data and said multiple resolution levels of compressed image data for all of said images such that, on said any given disk drive, all higher resolution levels of image data for any single image are stored within a same sector.

4. The image data storage system of claim 1, further comprising a controller in communication with said computer and said disk drive array and managing image data distribution across multiple disk drives in said disk drive array and further managing image data placement within said multiple tracks and said multiple sectors of said multiple disk drives.

5. The image data storage system of claim 1, said disk drive array comprising a redundant array of independent disks (RAID).

6. The image data storage system of claim 5, said computer further comprising an operating system managing image data distribution across said redundant array of independent disks (RAID) and said system further comprising a controller in communication with said computer and said disk drive array and managing image data placement within said multiple tracks and said multiple sectors of each disk.

7. The image data storage system of claim 1, said data image compress can be adapted to apply a JPEG 2000 compression standard to generate said multiple resolution levels of compressed image data such that each resolution level has approximately one-half the resolution of image data in a next higher resolution level image and further such that said lowest resolution level image data has a longest dimension between approximately 120 and 150 pixels and uses approximately 2 bits/pixel.

8. An image data storage system comprising:
a computer comprising a data compressor receiving original image data representative of multiple different images and compressing said original image data in order to generate, for each image, multiple resolution levels of compressed image data with each level representative of a progressively lower resolution copy of said image, said data compressor further generating, for each image at each level, additional information required to decompress said compressed image data; and
a disk drive array receiving, from said computer, said original image data, said multiple resolution levels of compressed image data, and said additional information,
said disk drive array comprising at least one disk drive, each disk drive having a center and multiple tracks encircling said center, and each track being sub-divided into multiple sectors,
said disk drive array storing said original image data and said multiple resolution levels of compressed image data for all of said images such that, on any given disk drive, sectors positioned on a track closest to said center store lowest resolution level image data and other sectors positioned on tracks farther from said center store higher resolution level image data, and
said disk drive array further storing any additional information associated with any one resolution level of compressed image data for a given image in a same track and sector as a next higher resolution level of compressed image data for said given image.

9. The image data storage system of claim 8, said disk drive array further storing said original image data and said multiple resolution levels of compressed image data for all of said images such that, on said any given disk drive, progressively higher resolution levels of image data are stored from a first track closest to said center to a last track closet to an outer edge of said given disk drive.

10. The image data storage system of claim 8, said disk drive array further storing said original image data and said multiple resolution levels of compressed image data for all of said images such that, on said any given disk drive, all higher resolution levels of image data for any single image are stored within a same sector.

11. The image data storage system of claim 8, further comprising a controller in communication with said computer and said disk drive array and managing image data distribution across multiple disk drives in said disk drive array and further managing image data placement within said multiple tracks and said multiple sectors of said multiple disk drives.

12. The image data storage system of claim 8, said disk drive array comprising a redundant array of independent disks (RAID).

13. The image data storage system of claim 12, said computer further comprising an operating system managing image data distribution across said redundant array of independent disks (RAID) and said system further comprising a controller in communication with said computer and said disk drive array and managing image data placement within said multiple tracks and said multiple sectors of each disk.

14. The image data storage system of claim 8, said data image compressor applying a JPEG 2000 compression standard to generate said multiple resolution levels of compressed image data such that each resolution level has approximately one-half the resolution of image data in a next higher resolution level image and further such that said lowest resolution level image data has a longest dimension between approximately 120 and 150 pixels and uses approximately 2 bits/pixel.

15. An image data storage method comprising:
receiving, by a computer, original image data representative of multiple different images;
compressing, by a data compressor in said computer, said original image data in order to generate, for each image, multiple resolution levels of compressed image data with each level representative of a progressively lower resolution copy of said image;
receiving, by a disk drive array from said computer, said original image data and said multiple resolution levels of compressed image data,
said disk drive array comprising at least one disk drive, each disk drive having a center and multiple tracks encircling said center, and each track being sub-divided into multiple sectors; and
storing, by said disk drive array, said original image data and said multiple resolution levels of compressed image data for all of said images such that, on any given disk drive, sectors positioned on a track closest to said center store lowest resolution level image data and other sectors positioned on tracks farther from said center store higher resolution level image data.

16. The image data storage method of claim 15, said storing further comprising storing said original image data and said multiple resolution levels of compressed image data for all of said images such that, on said any given disk, progressively higher resolution levels of image data are stored from a first track closest to said center to a last track closet to an outer edge of said given disk drive.

17. The image data storage method of claim 15 said storing further comprising storing said original image data and said multiple resolution levels of compressed image data for all of said images such that, on said any given disk, all higher resolution levels of image data for any single image are stored within a same sector.

18. The image data storage method of claim 15, further comprising managing, by a controller and during said storing, image data distribution across multiple disk drives in said disk drive array and manage data placement within said multiple tracks and said multiple sectors of said multiple disk drives.

19. The image data storage method claim 15, aid disk drive array comprising a redundant array of independent disks (RAID).

20. The image data storage method of claim 19, further comprising:
managing, by an operating system of said computer, image data distribution across said redundant array of independent disks (RAID); and
managing, by a controller in communication with said computer and said disk drive array, image data placement within said multiple tracks and said multiple sectors of each disk.

21. An image data storage method comprising:
receiving, a computer, original image data representative of multiple different images;
compressing, by a data compressor in said computer, said original image data in order to generate, for each image, multiple resolution levels of compressed image data with each level representative of a progressively lower resolution copy of said image and, for each image at each level, additional information required to decompress said compressed image data;
receiving, by a disk drive array from said computer, said original image data, said multiple resolution levels of compressed image data, and said additional information,
said disk drive array comprising at least one disk drive, each disk drive having a center and multiple tracks encircling said center, and each track being sub-divided into multiple sectors; and
storing, by said disk drive array, said original image data, said multiple resolution levels of compressed image data, and said additional information for all of said images such that, on any given disk drive, progressively higher resolution levels of image data are stored from a first track closest to said center to a last track closet to an outer edge of said given disk drive and further such that any additional information associated with any one resolution level of compressed image data for a given image is stored in a same track and sector as a next higher resolution level of compressed image data for said given image.

* * * * *